(12) United States Patent
Chang (10) Patent No.: US 11,652,292 B2
(45) Date of Patent: May 16, 2023

(54) DUAL ANTENNA WITH A SHARED RADIATOR

(71) Applicant: NANJING SILERGY MICRO (HK) CO., LIMITED, Causeway Bay (HK)

(72) Inventor: Chia-Lin Chang, Causeway Bay (HK)

(73) Assignee: NANJING SILERGY MICRO (HK) CO., LIMITED, Causeway Bay (HK)

( * ) Notice: Subject to any disclaimer, the term of this patent is extended or adjusted under 35 U.S.C. 154(b) by 0 days.

(21) Appl. No.: 17/396,824

(22) Filed: Aug. 9, 2021

(65) Prior Publication Data

US 2022/0069466 A1    Mar. 3, 2022

(30) Foreign Application Priority Data

Aug. 25, 2020 (CN) .......................... 202010863280.4

(51) Int. Cl.
*H01Q 5/314* (2015.01)
*G01D 5/24* (2006.01)

(52) U.S. Cl.
CPC .............. *H01Q 5/314* (2015.01); *G01D 5/24* (2013.01)

(58) Field of Classification Search
CPC .. G01D 5/00; G01D 5/12; G01D 5/14; G01D 5/24; H01Q 5/00; H01Q 5/30; H01Q 5/307; H01Q 5/314; H01Q 1/00; H01Q 1/12; H01Q 1/22; H01Q 1/24; H01Q 1/241; H01Q 1/242; H01Q 1/245; H01Q 1/36; H01Q 1/48; H01Q 1/50; H01Q 1/52; H01Q 9/00; H01Q 9/04; H01Q 9/30; H01Q 9/42; H04B 1/00; H04B 1/38; H04B 1/3827; H04B 1/3833; H04B 1/3838
USPC ................................ 324/600, 649, 658, 686
See application file for complete search history.

(56) References Cited

U.S. PATENT DOCUMENTS

| 6,049,314 A | * | 4/2000 | Munson ............... H01Q 9/0471 343/846 |
| 2015/0234019 A1 | * | 8/2015 | Biber ................. G01R 33/3415 324/322 |

FOREIGN PATENT DOCUMENTS

| CN | 106299604 A | * | 1/2017 | ............. H01Q 1/242 |
| CN | 110911842 B | * | 5/2021 | ........... H01Q 1/2258 |
| CN | 114122716 A | * | 3/2022 | ............... H01Q 1/36 |

* cited by examiner

*Primary Examiner* — Hoai-An D. Nguyen
(74) *Attorney, Agent, or Firm* — Amin, Turocy & Watson, LLP (57) ABSTRACT

A dual antenna with a shared radiator includes a radiator unit, a first feed-in unit, a second feed-in unit, a sensing module and a ground unit. The first feed-in unit and the second feed-in unit are respectively coupled with the radiator unit. The sensing module is connected to a substantial center of the radiator unit and used for sensing a distance between the radiator unit and an external object through the radiator unit. The ground unit is connected to the sensing module. The first feed-in unit is used to send or receive a first radio frequency signal together with the radiator unit, and the second feed-in unit is used to send or receive a second radio frequency signal together with the radiator unit.

10 Claims, 7 Drawing Sheets

DUAL ANTENNA WITH A SHARED RADIATOR

RELATED APPLICATIONS

The present application claims the priority of Chinese Application No. 202010863280.4, filed Aug. 25, 2020, the disclosure of which is hereby incorporated by reference herein in its entirety.

BACKGROUND OF THE INVENTION

1. Field of the Invention

The present disclosure generally relates to a dual antenna with a shared radiator, and, more particularly, to a dual antenna with a shared radiator used in specific absorption rate (SAR) test.

2. Description of the Related Art

In general, in order to prevent the electromagnetic waves generated by communication electronic products such as mobile phones or tablet computers from affecting human health, these electronic products need to pass the SAR test. In the prior art, a sensing module is electrically connected to an antenna of the electronic product to detect the distance between the antenna and the human body. Then adjusting the output power of the radio frequency signal according to the distance to meet the requirement of the SAR test specifications. The radio frequency signal used for communication is a high frequency signal. On the other hand, the sensing module determines the distance by detecting the change in a capacitance of the antenna radiator, which is a low-frequency signal. Therefore, it is necessary to add a capacitor between the antenna radiator and the ground plane to isolate the high and low frequency signals to avoid mutual interference.

However, the capacitor used in the prior art is generally a ceramic capacitor. The capacitance value of the ceramic capacitor varies according to the operating frequency of the antenna, which is about dozens of pF. The capacitance value of the ceramic capacitor is close to the upper limit of the detectable capacitance value of the sensing module. Consequently, the capacitor will affect the distance detection capability of the sensing module, so that the maximum distance that can be sensed is reduced. Therefore, how to provide a dual antenna with a shared radiator that can separate the high and low frequency signals without affecting the distance detection capability, which has become an urgent problem to be solved in the industry.

SUMMARY OF THE INVENTION

In order to solve the aforementioned problems in the prior art, an object of the present invention is to provide a single antenna with a shared radiator that can isolate high and low frequency signals without affecting the distance detection capability.

In light of solving the foregoing problems of the prior art, the present invention provides a dual antenna with a shared radiator comprising a radiator unit, a first feed-in unit, a second feed-in unit, a sensing module and a ground unit.

The first feed-in unit is coupled with the radiator unit. The second feed-in unit is coupled with the radiator unit. The sensing module is connected to a substantial center of the radiator unit and used for sensing a distance between the radiator unit and an object by the radiator unit. The ground unit is connected to the sensing module. The first feed-in unit is used to send or receive a first radio frequency signal together with the radiator unit, and the second feed-in unit is used to send or receive a second radio frequency signal together with the radiator unit.

In an embodiment, the first feed-in unit is symmetrical to the second feed-in unit.

In an embodiment, the first feed-in unit and the second feed-in unit are loop antennas, monopole antennas or PIFA antennas.

In an embodiment, a coupling portion of the first feed-in unit or a coupling portion of the second feed-in unit which is coupled with the radiator unit has a length which is less than or equal to ¼ wavelength.

In an embodiment, the dual antenna with a shared radiator according to the present invention further includes a first radio frequency signal module and a second radio frequency signal module. The first radio frequency signal module is connected to the first feed-in unit and used to generate or receive the first radio frequency signal. The second radio frequency signal module is connected to the second feed-in unit and used to generate or receive the second radio frequency signal. The first radio frequency signal module and the second radio frequency signal module are further connected to the ground unit.

In an embodiment, the sensing module is further used to generate a distance signal according to the distance between the radiator unit and the object, and the first radio frequency signal module and the second radio frequency signal module are further used to adjust output power of the first radio frequency signal and the second radio frequency signal according to the distance signal respectively.

In an embodiment, the radiator unit has a rectangular shape.

In an embodiment, the radiator unit has a length which is less than or equal to ½ wavelength.

In an embodiment, the dual antenna with a shared radiator according to the present invention further includes at least one connecting capacitor. The at least one connecting capacitor is connected between the first feed-in unit and the radiator unit, or between the second feed-in unit and the radiator unit.

In an embodiment, the dual antenna with a shared radiator according to the present invention further includes at least one connecting inductor. The at least one connecting inductor is connected between the sensing module and the radiator unit.

Compared to the prior art, a sensing module of the dual antenna with a shared radiator according to the present invention is connected to a substantial center of a radiator unit. Since the radio frequency signals generated by the first radio frequency signal module and the second radio frequency signal module would be severely attenuated at the center of the radiator unit, the distance sensing capability of the sensing module would not be affected. At the same time, the sensing module connected to the center of the radiator unit would not affect the performance of the first radio frequency signal module and the second radio frequency signal module. Consequently, it is not necessary to add capacitors or inductors between the sensing module and other units to isolate or separate the high and low frequency signals. By doing so, the overall size and the cost of the dual antenna with a shared radiator can be reduced and the distance sensing capability of the sensing module can be increased.

BRIEF DESCRIPTION OF THE DRAFLAPS

DETAILED DESCRIPTION

The present invention is described by the following specific embodiments. Those with ordinary skills in the arts can readily understand other advantages and functions of the present invention after reading the disclosure of this specification. Any changes or adjustments made to their relative relationships, without modifying the substantial technical contents, are also to be construed as within the range implementable by the present invention.

It should be noted that the structure, ratio, size, etc. shown in the drawings in this specification are only used to match the content disclosed in the specification for the understanding and reading of those who are familiar with the art, and are not intended to limit the implementation of the present invention. Therefore, it has no technical significance, any structural modification, proportion change or size adjustment shall fall under the present invention without affecting the effects and objectives that can be achieved by the present invention, the disclosed technical content must be within the scope of coverage. At the same time, the terms such as "upper", "inner", "outer", "bottom" and "one" cited in this specification are only for ease of description, not to limit the implementation scope of the present invention, the relative changes or adjustments, without substantial changes to the technical content, shall be regarded as the scope of the present invention, and shall be described first.

Figure 1:
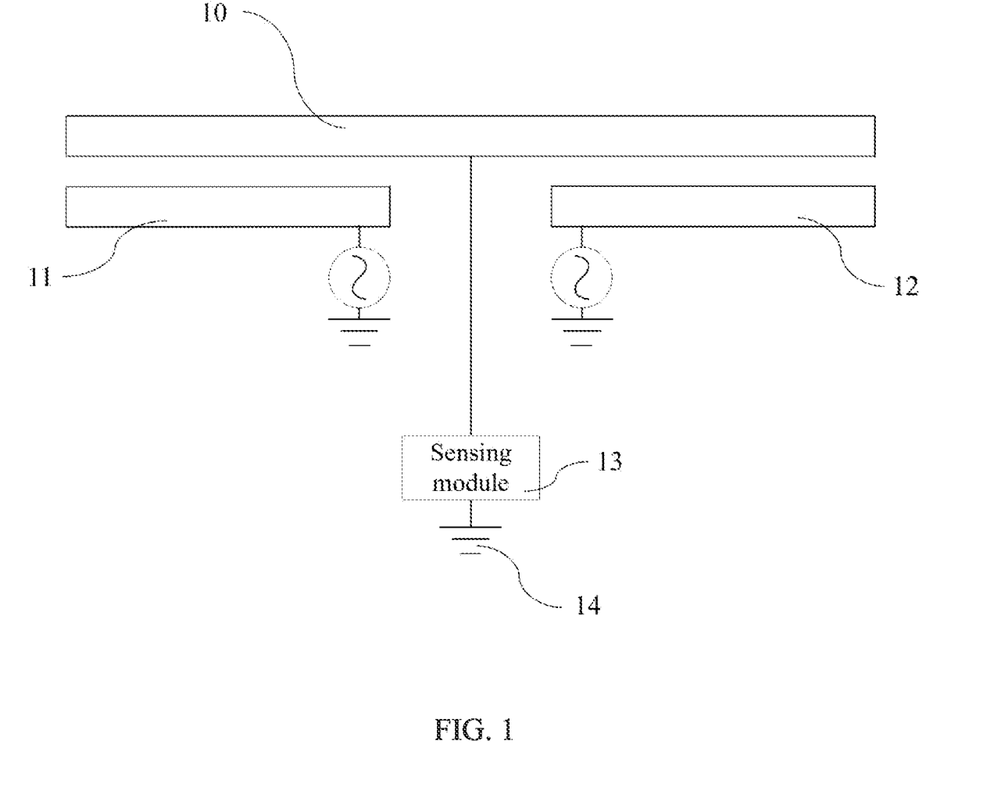
FIG. 1 illustrates a schematic view of a structure of the dual antenna with a shared radiator according to a first embodiment of the present invention.

Please refer to FIG. 1. FIG. 1 illustrates a schematic view of a structure of the dual antenna with a shared radiator according to a first embodiment of the present invention. As shown in the figure, the a dual antenna with a shared radiator according to the present invention includes a radiator unit 10, a first feed-in unit 11, a second feed-in unit 12, a sensing module 13 and a ground unit 14.

In an embodiment, the first feed-in unit 11 is coupled with the radiator unit 10. The second feed-in unit 12 is coupled with the radiator unit 10. The first feed-in unit 11 is used to send or receive a first radio frequency signal together with the radiator unit 10, and the second feed-in unit 12 is used to send or receive a second radio frequency signal together with the radiator unit 10. The first radio frequency signal or the second radio frequency signal can be one of the operating frequencies, and can be the same frequency band or different frequency bands. For example, the first radio frequency signal or the second radio frequency signal can be electromagnetic wave signals in Wi-Fi frequency band, LTE frequency band or 5G New Radio frequency band standards, but is not limited to this. Besides, the radiator unit 10 contribute to isolating the first radio frequency signal and the second radio frequency signal.

The sensing module 13 is connected to a substantial center of the radiator unit 10. The sensing module 13 is used for sensing a distance between the radiator unit 10 and an object (such as a human body) by the radiator unit 10. The ground unit 14 is connected to the sensing module 13. When the object approaches the dual antenna of the present invention, the sensing module 13 can sense the change of the parasitic capacitance generated by the radiator unit 10. In this way, the distance between the radiator unit 10 and the object can be determined. If the sensing module 13 is not connected at the center of the radiator unit 10, it would cause a frequency deviation.

On the other hand, since the first radio frequency signal or the second radio frequency signal is severely attenuated when it transmitted to the center of the radiator unit 10, the sensing capability of the sensing module 13 will not be affected by the first radio frequency signal or the second radio frequency signal. Consequently, a capacitance or inductance used to isolate or separate the high and low frequency signals between the sensing module and other units in the prior art is not required in the dual antenna with a shared radiator of the present invention. As a result, the overall size and cost of the dual antenna with a shared radiator according to the present invention can be reduced and the sensing distance and the distance sensing capacity of the sensing module 13 can be increased.

Furthermore, a lumped capacitor component used in the prior art would have a higher Q factor (quality factor), which will result in a narrower antenna bandwidth. In the present invention, distributed capacitors are formed between the first feed-in unit 11 and the radiator unit 10, and between the second feed-in unit 12 and the radiator unit 10 according to the present invention. Distributed capacitors would achieve a lower Q factor and as a result, the antenna bandwidth would be wider.

In an embodiment, the first feed-in unit 11 is symmetrical to the second feed-in 12 unit, and the line passing through the center of the radiator unit 10 is the axis of symmetry of the first feed-in unit 11 and the second feed-in 12 unit, further, the line being perpendicular to the center of the radiator unit 10 is the axis of symmetry of the first feed-in unit 11 and the second feed-in 12 unit.

Figure 2:
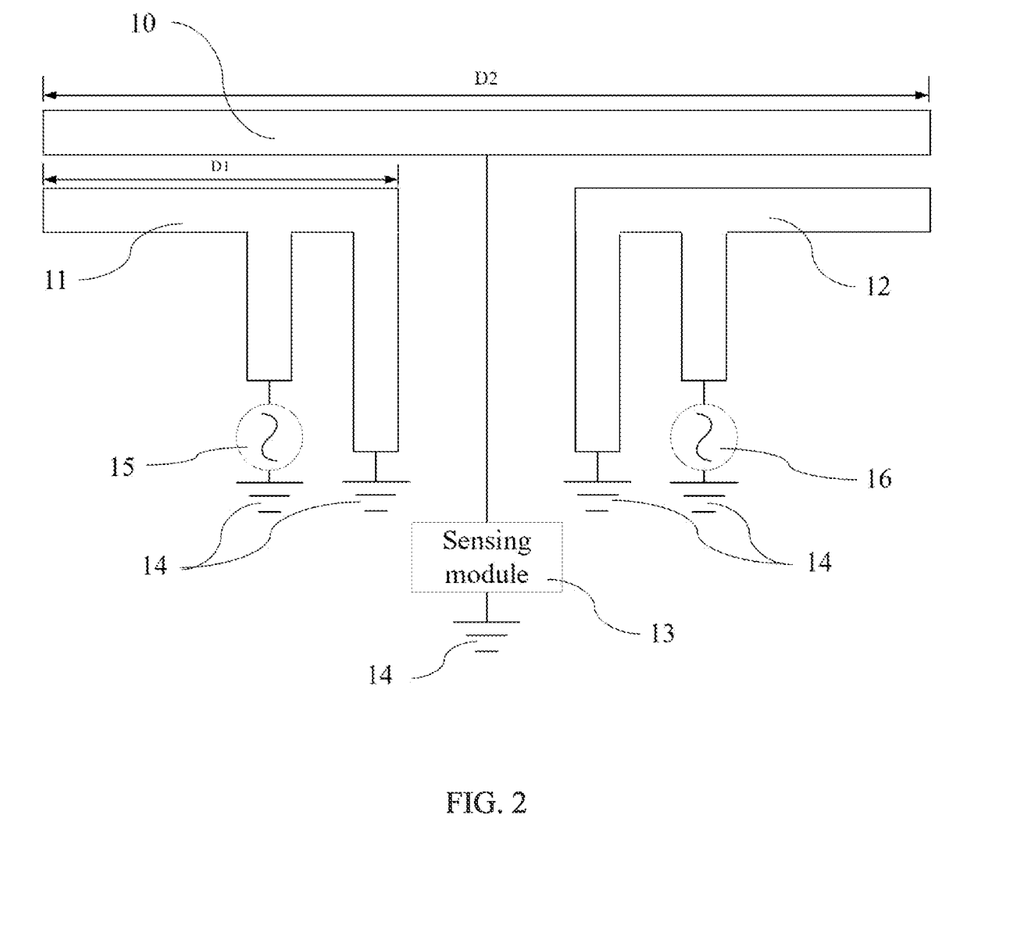
FIG. 2 illustrates a schematic view of a structure of the dual antenna with a shared radiator according to a second embodiment of the present invention.

Please refer to FIG. 2. FIG. 2 illustrates a schematic view of a structure of the dual antenna with a shared radiator according to a second embodiment of the present invention. In an embodiment, the first feed-in unit 11 and the second feed-in unit 12 are loop antennas, monopole antennas or PIFA antennas, but not limited to.

Figure 3:
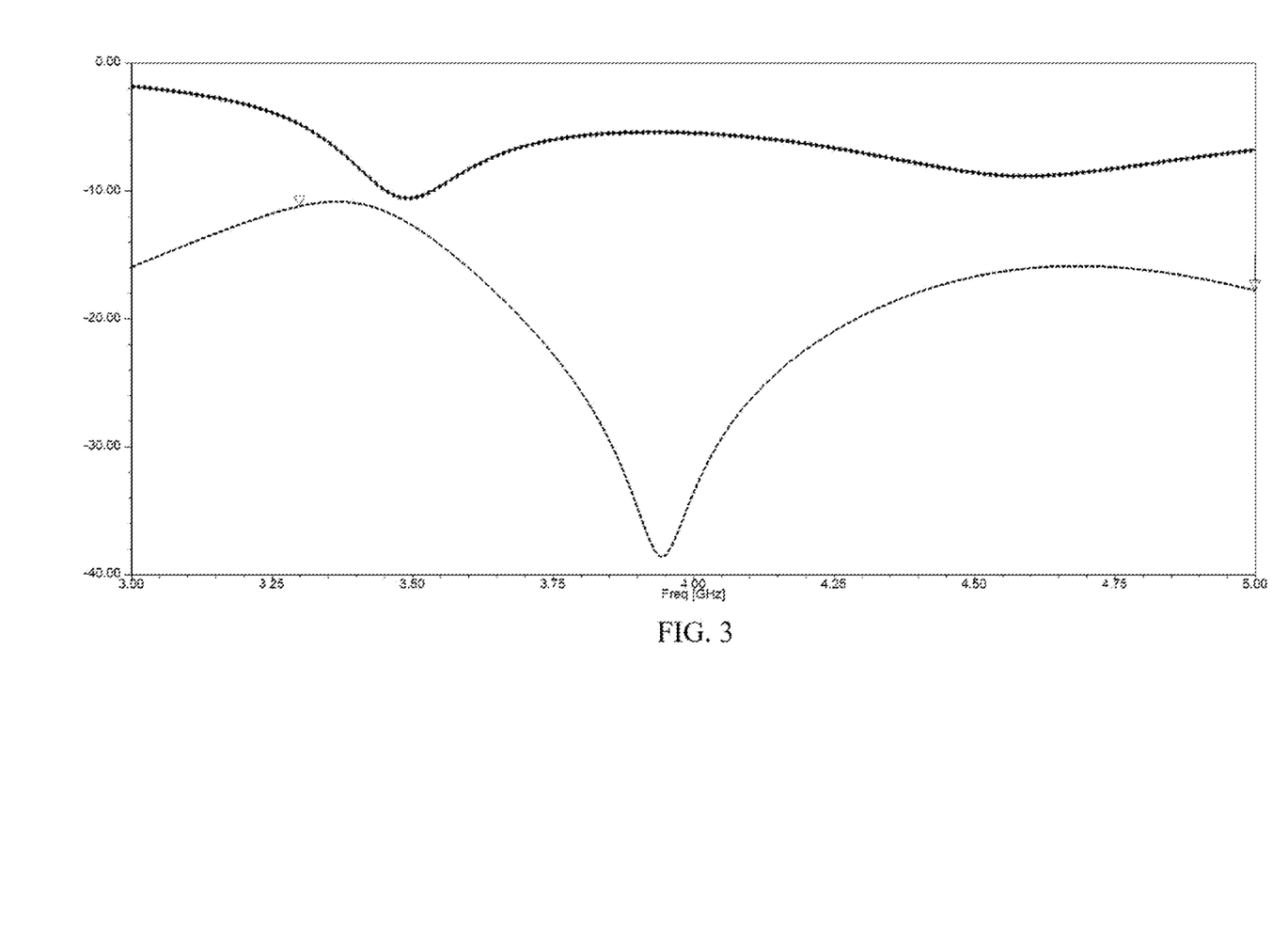
FIG. 3 illustrates a schematic view of the frequency response of the dual antenna with a shared radiator according to a third embodiment of the present invention.

Please refer to FIG. 3. FIG. 3 illustrates a schematic view of the frequency response of the dual antenna with a shared radiator according to a third embodiment of the present invention. The vertical axis represents the gain dB value, and the horizontal axis represents the frequency value. As shown in the figure, the dual antenna with a shared radiator according to the present invention can correspond to multiple operating frequencies. In this embodiment, the dual antenna with a shared radiator corresponds to two operating frequencies, N77 to N79, 3.3 to 5 GHz, but not limited to. According to the present invention, adjusting a length of the radiator unit 10, a length of the first feed-in unit 11 or a length of the second feed-in unit 12 will affect the frequency response.

Figure 4:
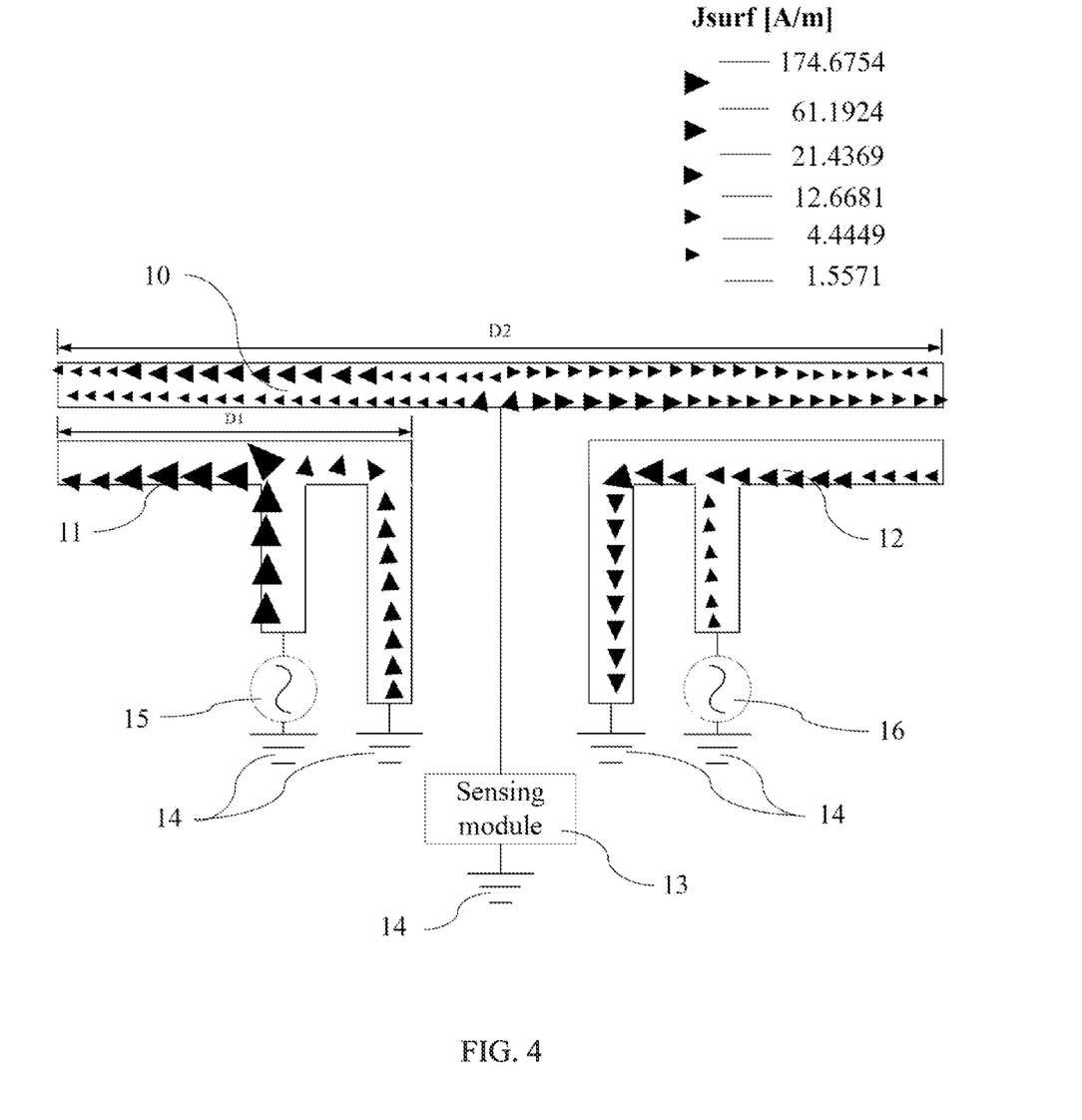
FIG. 4 illustrates a schematic view of the current at the first operating frequency according to a fourth embodiment of the present invention.

Please refer to FIG. 4. FIG. 4 illustrates a schematic view of the current at the first operating frequency according to a fourth embodiment of the present invention. The triangle represents the current, and the bigger the triangle is, the greater the current is. In an embodiment, a length of a coupling portion of the first feed-in unit 11 and the radiator unit 10, or a length of a coupling portion of the second feed-in unit 12 and the radiator unit 10 may less than or equal to ¼ wavelength, wherein the wavelength may be the wavelength of the operating frequency. As shown in FIG. 4, the length of the coupling portion of the first feed-in unit 11 and the radiator unit 10 is D1. In this embodiment, D1 is designed to be less than or equal to ¼ wavelength of the first operating frequency. When the dual antenna with a shared radiator is operated at the first operating frequency, the current flowing to the center of the radiator unit 10 will be severely attenuated. Consequently, the sensing module 13 connected to the center of the radiator unit 10 would not affect the performance of sending or receiving radio frequency signals.

Figure 5:
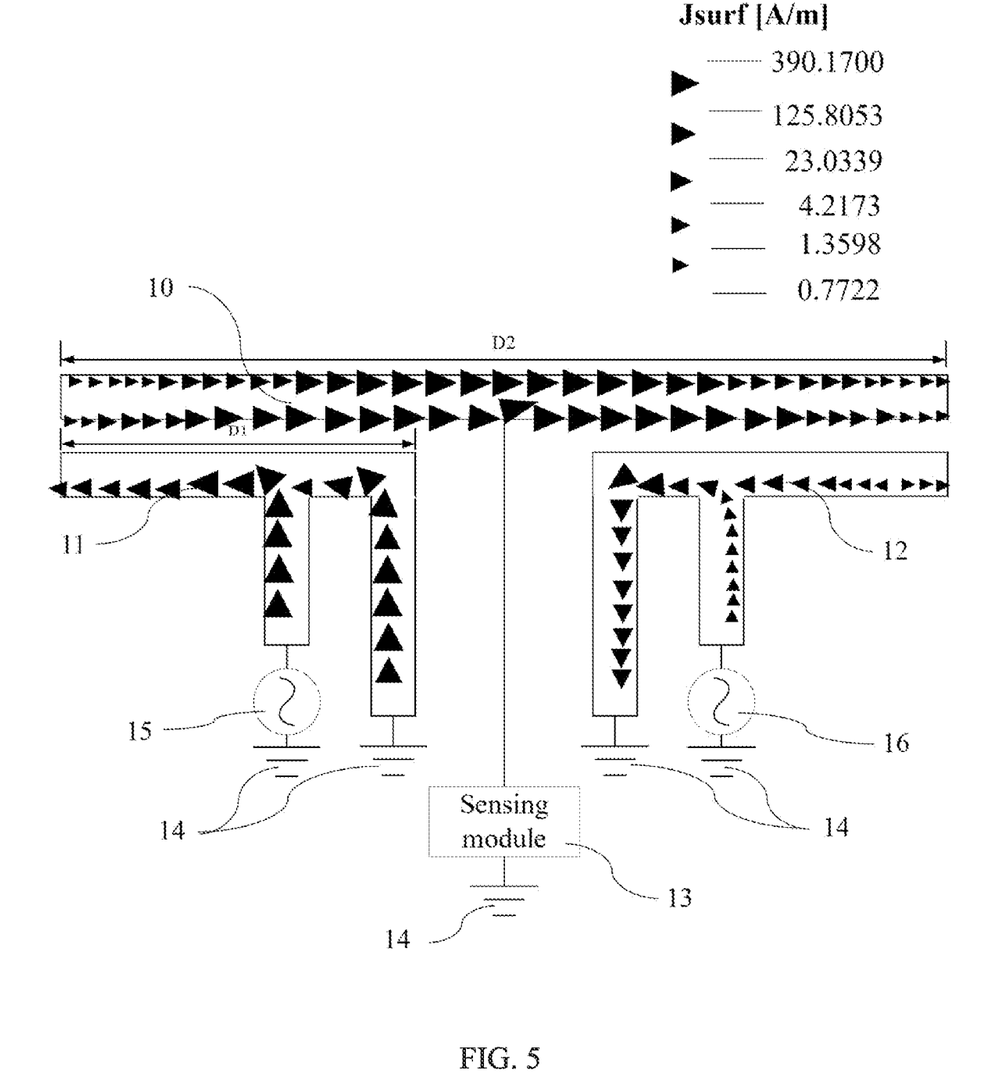
FIG. 5 illustrates a schematic view of the current at the second operating frequency according to a fifth embodiment of the present invention.

Please refer to FIG. 5. FIG. 5 illustrates a schematic view of the current at the second operating frequency according to a fifth embodiment of the present invention. The triangle represents the current, and the bigger the triangle is, the greater the current is. In an embodiment, the radiator unit 10 may has a length, which is less than or equal to ½ wavelength, wherein the wavelength may be the wavelength of the operating frequency. As shown in FIG. 5, the length of the radiator unit 10 is D2. In this embodiment, D2 is designed to be less than or equal to ½ wavelength of the second operating frequency. When the dual antenna with a shared radiator is operated at the second operating frequency, the current at the center of the radiator unit 10 would be maximum. Consequently, the sensing module 13 connected to the center would not affect the performance of sending or receiving radio frequency signals.

In more detail, when the dual antenna with a shared radiator according to the present invention corresponds to the first and the second operating frequencies, the length of the coupling portion of the first feed-in unit 11 and the radiator unit 10 can be designed to be D1. D1 is less than or equal to the ¼ wavelength of first operating frequency. At the same time, the length of the radiator unit 10 is designed to be D2. D2 is less than or equal to ½ wavelength of the second operating frequency. As a result, the sensing module 13 connected to the center of the radiator unit 10 would not affect the performance of sending or receiving radio frequency signals.

In an embodiment, the dual antenna with a shared radiator according to the present invention further includes a first radio frequency signal module 15 and a second radio frequency signal module 16. The first radio frequency signal module 15 is connected to the first feed-in unit 11 and used to generate or receive the first radio frequency signal. The second radio frequency signal module 16 is connected to the second feed-in unit 12 and used to generate or receive the second radio frequency signal. The first radio frequency signal module 15 and the second radio frequency signal module 16 are further connected to the ground unit 14.

In an embodiment, the sensing module 13 is further used to generate a distance signal according to the distance between the radiator unit and the object. The first radio frequency signal module 15 and the second radio frequency signal module 16 are further used to adjust output power of the first radio frequency signal and the second radio frequency signal according to the distance signal respectively. For example, when an object, such as a human body, approaches the dual antenna with a shared radiator of the present invention, the first radio frequency signal module 15 or the second radio frequency signal module 16 would reduce the output power of the radio frequency signal to meet the requirements of the SAR test specifications.

In an embodiment, the radiator unit 10 has a rectangular shape, but not limited to.

Figure 6:
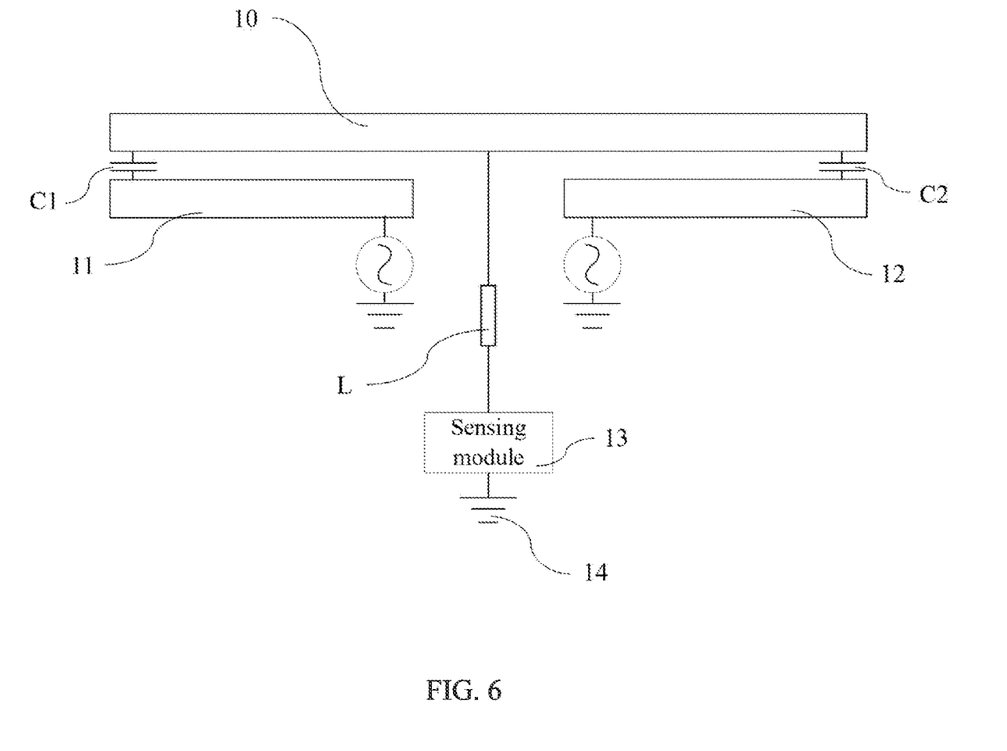
FIG. 6 illustrates a schematic view of a structure of the dual antenna with a shared radiator according to a sixth embodiment of the present invention.

Please refer to FIG. 6. FIG. 6 illustrates a schematic view of a structure of the dual antenna with a shared radiator according to a sixth embodiment of the present invention. In an embodiment, the dual antenna with a shared radiator according to the present invention further includes at least one connecting capacitor. In the embodiment shown in FIG. 6, the dual antenna with a shared radiator according to the present invention includes two connecting capacitors C1 and C2. The connecting capacitor C1 is connected between the first feed-in unit 11 and the radiator unit 10. The connecting capacitor C2 is connected between the second feed-in unit 12 and the radiator unit 10. In other embodiments of the present invention, the dual antenna with a shared radiator may have only one of the connecting capacitors C1 or C2, or may have connecting capacitors more than two.

In this embodiment, the connecting capacitors C1 and C2 are disposed in the dual antenna with a shared radiator, the sensing module 13 can sense the distance to an object by the radiator unit 10, the first feed-in unit 11, and the second feed-in unit 12. The distance sensing capability of the sensing module 13 can be improved, especially for the object approaching from the first feed-in unit 11 or the second feed-in unit 12, which means the sensing range of the sensing module 13 is further improved.

In an embodiment, the dual antenna with a shared radiator according to the present invention further includes at least one connecting inductor L. The connecting inductor L is connected between the sensing module 13 and the radiator unit 10. For radio frequency signals with different transmitted powers, the connecting inductor L can be additionally connected between the sensing module 13 and the radiator unit 10 to isolate or separate the high-frequency signal with high-power.

Figure 7:
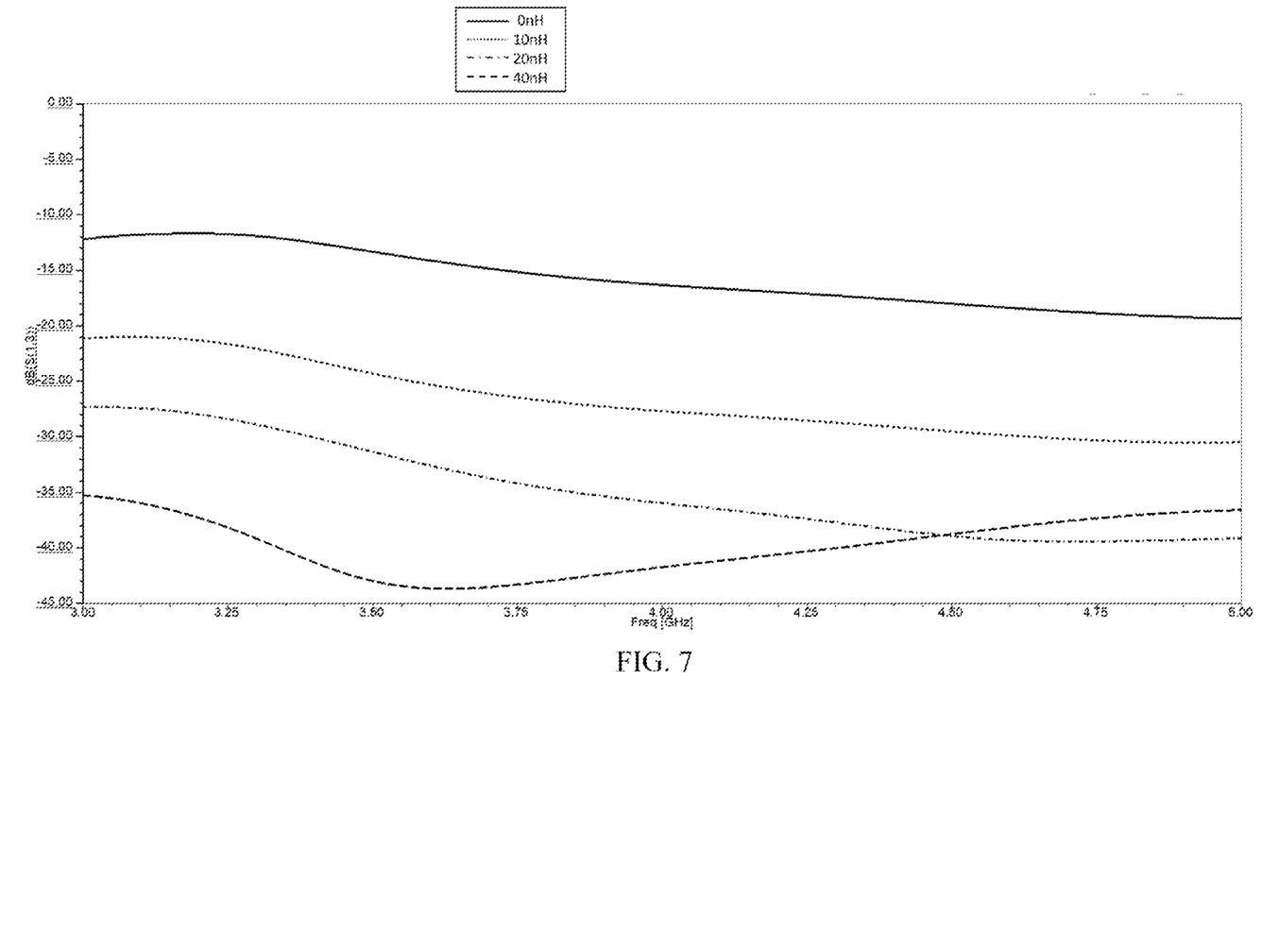
FIG. 7 illustrates a schematic view of the frequency response of the dual antenna with a shared radiator according to a seventh embodiment of the present invention.

Please refer to FIG. 7. FIG. 7 illustrates a schematic view of the frequency response of the dual antenna with a shared radiator according to a seventh embodiment of the present invention. The vertical axis represents the gain dB value, and the horizontal axis represents the frequency value. As shown in the figure, adding inductors of different inductance values (10 nH to 40 nH) in front of the sensing module 13 can achieve different attenuation powers (20 dB to 45 dB) for the first radio frequency signal or the second radio frequency signal with different transmitted powers.

In summary, a sensing module of the dual antenna with a shared radiator according to the present invention is connected to a substantial center of a radiator unit. Since radio frequency signals of the first radio frequency signal module and the second radio frequency signal module would be severely attenuated at the center of the radiator unit, they would not affect the sensing capability of the sensing module. At the same time, the sensing module connected to the center of the radiator unit will not affect the performance of the first radio frequency signal module and the second radio frequency signal module. Consequently, it is unnecessary to add capacitors or inductors between the sensing module and other units to isolate or separate the high and low frequency signals. By doing so, the overall size and cost of the dual antenna with a shared radiator would be reduced and the sensing distance and the distance sensing capability of the sensing module can be increased.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A dual antenna with a shared radiator, comprising:
   a radiator unit;
   a first feed-in unit coupled with the radiator unit;
   a second feed-in unit coupled with the radiator unit;
   a sensing module connected to a substantial center of the radiator unit and used for sensing a distance between the radiator unit and an object by the radiator unit; and
   a ground unit connected to the sensing module,
   wherein the first feed-in unit and the second feed-in unit are not directly connected to the radiator unit, the first feed-in unit is used to send or receive a first radio frequency signal together with the radiator unit, and the second feed-in unit is used to send or receive a second radio frequency signal together with the radiator unit.

2. The dual antenna with a shared radiator of claim 1, wherein the first feed-in unit is symmetrical to the second feed-in unit.

3. The dual antenna with a shared radiator of claim 1, wherein the first feed-in unit and the second feed-in unit are loop antennas, monopole antennas or PIFA antennas.

4. The dual antenna with a shared radiator of claim 1, wherein a length of a coupling portion of the first feed-in unit and the radiator unit or a length of a coupling portion of the second feed-in unit and the radiator unit is less than or equal to ¼ wavelength.

5. The dual antenna with a shared radiator of claim 1, further comprising:
   a first radio frequency signal module connected to the first feed-in unit and used to generate or receive the first radio frequency signal; and
   a second radio frequency signal module connected to the second feed-in unit and used to generate or receive the second radio frequency signal,
   wherein the first radio frequency signal module and the second radio frequency signal module are further connected to the ground unit.

6. The dual antenna with a shared radiator of claim 5, wherein the sensing module is further used to generate a distance signal according to the distance between the radiator unit and the object, and the first radio frequency signal module and the second radio frequency signal module are further used to adjust output power of the first radio frequency signal and the second radio frequency signal according to the distance signal respectively.

7. The dual antenna with a shared radiator of claim 1, wherein the radiator unit has a rectangular shape.

8. The dual antenna with a shared radiator of claim 1, wherein the radiator unit has a length which is less than or equal to ½ wavelength.

9. The dual antenna with a shared radiator of claim 1, further comprising:
   at least one connecting capacitor connected between the first feed-in unit and the radiator unit, or between the second feed-in unit and the radiator unit.

10. The dual antenna with a shared radiator of claim 1, further comprising:
    at least one connecting inductor connected between the sensing module and the radiator unit.

* * * * *